United States Patent [19]
Engdahl et al.

[11] Patent Number: 5,209,454
[45] Date of Patent: May 11, 1993

[54] AUTOMATIC SAFETY SHUTOFF VALVE

[75] Inventors: Paul D. Engdahl, 3101 Fairview, Space 113, Santa Ana, Calif. 92704; Roger P. Engdahl, Costa Mesa, Calif.

[73] Assignee: Paul D. Engdahl, Costa Mesa, Calif.

[21] Appl. No.: 921,074

[22] Filed: Jul. 29, 1992

[51] Int. Cl.⁵ ............................................. F16K 17/36
[52] U.S. Cl. ........................................ 251/65; 137/38; 137/630.14
[58] Field of Search ................... 251/65; 137/38, 39, 137/630.14, 630.15

[56] References Cited

U.S. PATENT DOCUMENTS

| | | | |
|---|---|---|---|
| 791,339 | 5/1905 | Gold | 137/630.15 |
| 2,665,714 | 1/1954 | Greenwood | 137/630.14 X |
| 3,422,841 | 1/1969 | Farrer | 251/65 |
| 4,207,912 | 6/1980 | Ichikawa | 137/39 |
| 4,844,113 | 7/1989 | Jones | 137/39 |
| 5,113,901 | 5/1992 | Young | 251/65 X |
| 5,115,829 | 5/1992 | Franzke | 137/38 |

Primary Examiner—Robert G. Nilson
Attorney, Agent, or Firm—Lawrence Fleming

[57] ABSTRACT

A safey shutoff valve for insertion into a gas line or other fluid line, that closes in response to an electrical input pulse or to a seismic disturbance. A pivoted flapper arm is held in the open position by a permanent magnet embedded in it. When the magnetic attractive force is reduced enough, the arm swings down by gravity into the closed position and a primary flapper seal element seals the valve seat. Line pressure keeps it closed. The magnetic holding force may be reduced by means of an opposing electromagnet or by the mechanical displacement of a ferromagnetic ball. The valve is manually reset by turning a reset shaft to raise the flapper arm to the open position. The reset shaft also raises a secondary flapper to uncover a small bypass tube to bleed off any residual line pressure; this bypass is automatically closed when the valve closes. No standby power is required.

7 Claims, 3 Drawing Sheets

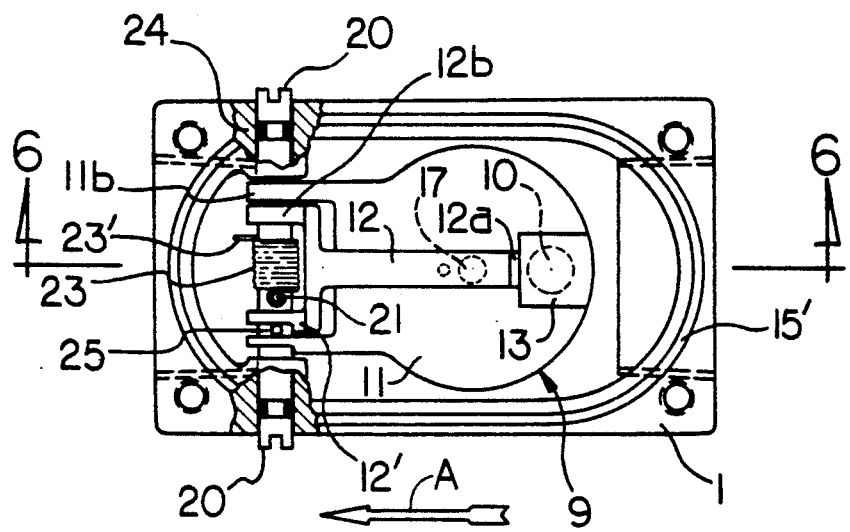
FIG. 5
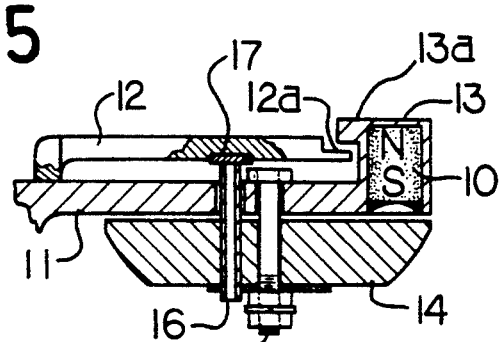
FIG. 6
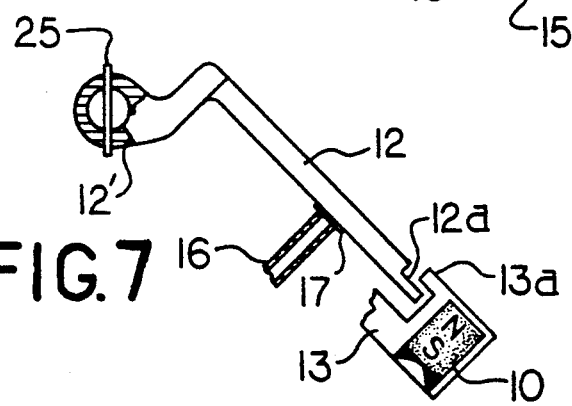
FIG. 7
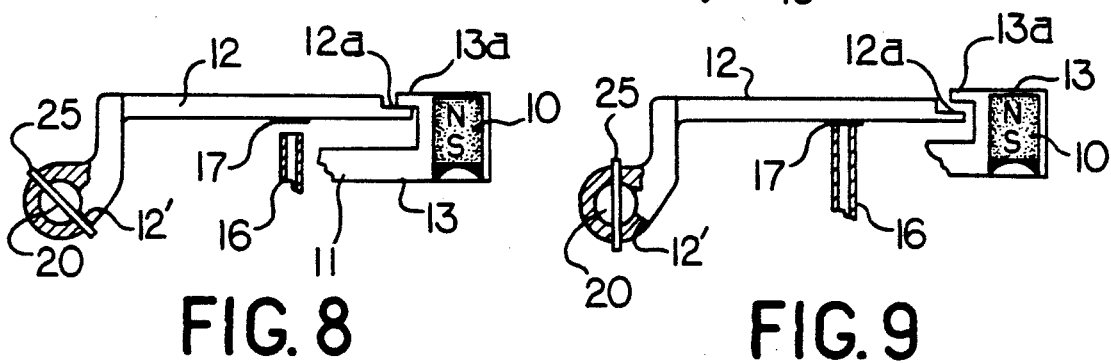
FIG. 8
FIG. 9

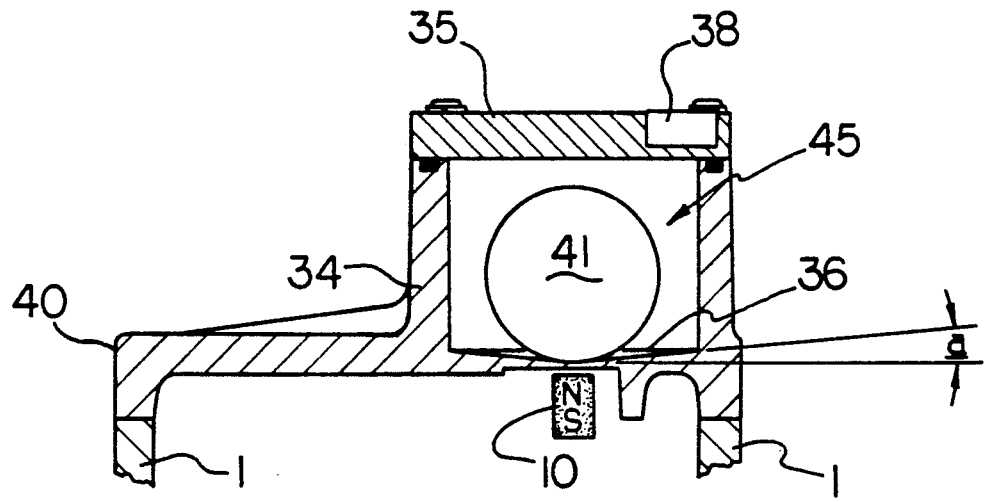
FIG. 10
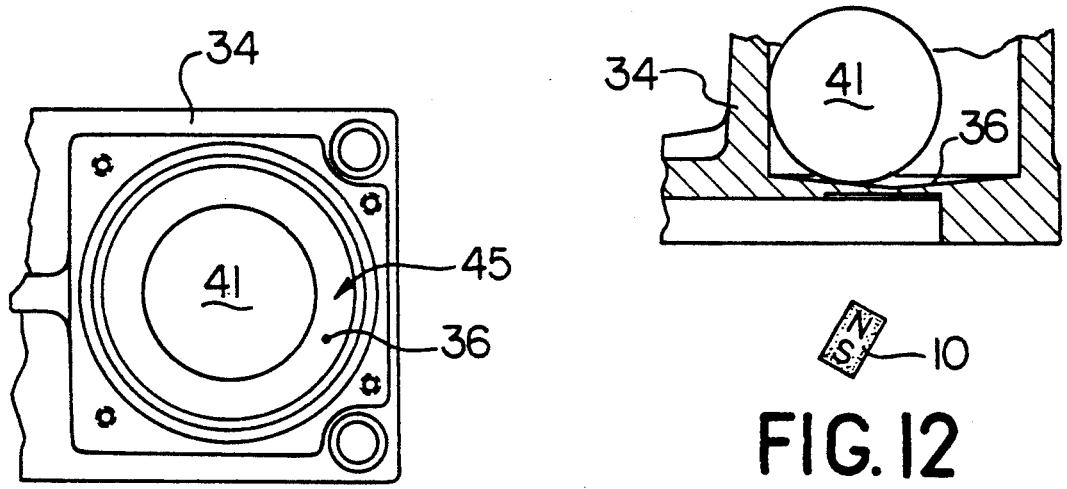
FIG. 11
FIG. 12
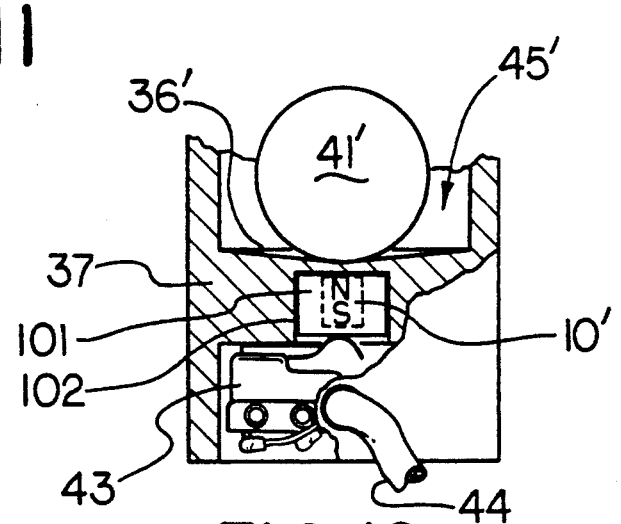
FIG. 13

AUTOMATIC SAFETY SHUTOFF VALVE

FIELD OF THE INVENTION

This invention relates to valves for automatically shutting off the flow of fluids in response to an emergency situation such as an earthquake. Such valves may be inserted in lines that carry, for example, gas or flammable liquids.

DESCRIPTION OF RELATED ART

Automatic shutoff valves of various kinds are known which respond to temperature, excessive pressure, seismic events, and the like. U.S. Pat. No. 4,844,113 to C.R. Jones shows a flapper-type valve where the pivoted flapper element is overbalanced by the rolling displacement of a ball, and is held shut by the fluid pressure. The pivoted closure element or flapper is held open by magnets; the ball may be displaced by a seismic event.

U.S. Pat. No. 3,422,841 to S. Farrer shows an automatic shutoff valve for gas supply lines which also employs a pivoted flapper mechanism. Closure here is initiated by excessive line pressure.

U.S. Pat. No. 4,018,419 to L. Monpetit discloses a magnetically-actuated valve, not an automatic safety type, in which a ferromagnetic ball is held in a "valve open" position by the attraction of a permanent magnet; this attraction is cancelled and the valve closed by an electromagnet whose field opposes that of the permanent magnet.

BRIEF SUMMARY

The present invention is a flapper-type safety shutoff valve for insertion into a line carrying gas, flammable liquids, or other fluid. The pivoted flapper element is held out of the line of fluid flow by magnetic means, such as a permanent (holding) magnet. When the magnetic attraction is suitably reduced, the flapper pivots down by gravity and covers a valve seat disposed at about a 45 degree angle to the axis of flow, shutting it off. The flapper element is held against the valve seat by the pressure of the fluid in the pipe.

The valve is manually resettable by turning an exposed end of the flapper pivot shaft with a screwdriver or a coin in a slot.

The magnetic attraction that holds the valve open may be reduced, to close the valve, in two different ways. The first comprises an electromagnet disposed, when energized, to oppose the field of the holding magnet. The holding magnet is contained in the movable flapper assembly itself. The electromagnet is located in a portion of the valve body. In practice, a short electrical pulse of, e.g., 0.1 second, from an external seismic alarm device energizing the electromagnet is sufficient to release the flapper and close the valve. Such a device is shown in my copending application Ser. No. 682,973.

The second means of release comprises a ball of soft ferromagnetic material disposed in a cavity just above the permanent magnet that is contained in the flapper assembly. The bottom of the cavity is shaped as a shallow cone, and the ball is free to roll therein. When the valve is level and stationary, the ball rests in the bottom of its cavity, close enough to the flapper magnet to permit it to hold the flapper up and the valve open. When, however, the valve body accelerates, as in an earthquake, the ball rolls out of this rest position to a new position away from the magnet, the flapper is released, and the valve closes. No standby power is required.

The mass of the ball combined with the restoring forces of the magnet and of gravity (due to the slope of the conical surface) constitute a mass-spring system with a generally determinable natural frequency. This system may be "tuned" to provide a desired response to frequencies commonly occurring in earthquakes. This form of the valve of the invention does not require any external apparatus to cause it to close in response to a seismic event or other mechanical disturbance.

The form of the invention, noted above, that employs an electromagnet to cancel the magnetic attraction and close the valve, may receive its energizing pulse from a computing seismometer of the kind described in my copending application for U.S. patent Ser. No. 682,973, filed Apr. 10, 1991 now U.S. Pat. No. 5,144,598.

The present valve is manually resettable, which requires certain novel features. After the valve closes, a pressure differential may remain across it. This pressure on the upstream side may prevent the flapper from being moved back out of its closed position. Hence, the present valve has a small bypass passage which may be opened to equalize the pressure on both sides of the flapper, so that it can be reset. The bypass is in the main or primary flapper, and is closed by a small secondary flapper that swings on the same pivot shaft. When the pivot shaft is turned to reset the valve, the secondary flapper opens first, uncovering the bypass hole to equalize the pressure; when the pressure is equalized, the same torque on the same pivot shaft operates to swing the primary flapper up to open the valve.

In the Drawing

FIG. 5 is a top view of the valve with the cover removed;

FIG. 6 is an enlarged partial sectional view of the flapper assembly, on lines 6—6 of FIG. 5;

FIG. 7, 8, and 9 are side detail views, partly in section, of the secondary flapper element in closed position, during reset, and after reset, respectively;

FIG. 10 is a semi-diagrammatic side sectional view of a modification of the valve cover employing a movable iron ball;

FIG. 11 is a partial top view of the modification of FIG. 10 with the cover removed;

FIG. 12 is a partial sectional view similar to FIG. 10 except that the ball is shown out of its rest position; and FIG. 13 is a partial sectional view of a seismically-actuated switch using a principle of the invention.

DETAILED DESCRIPTION OF PREFERRED EMBODIMENT

Figure 2:
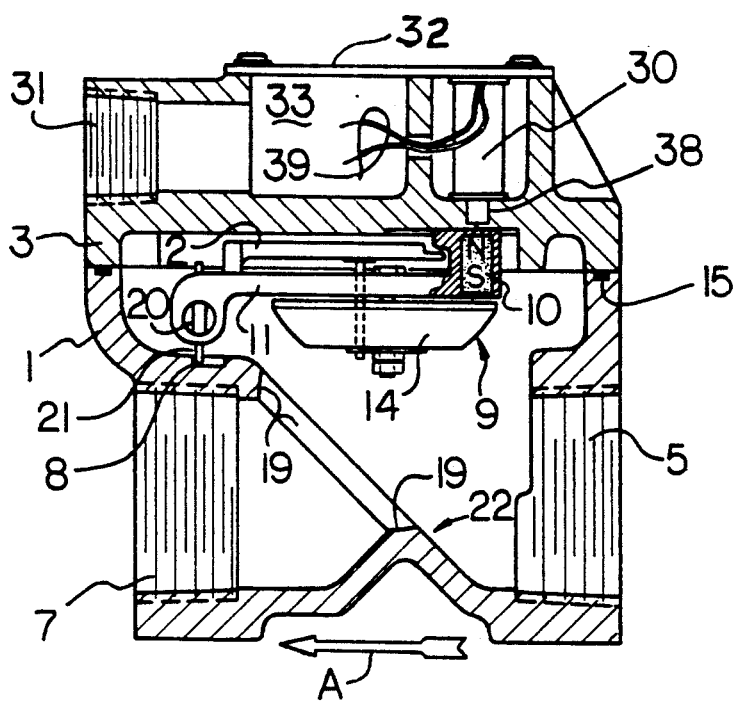
FIG. 2 is a side sectional view of the same valve, on lines 2—2 of FIG. 1.
Figure 1:
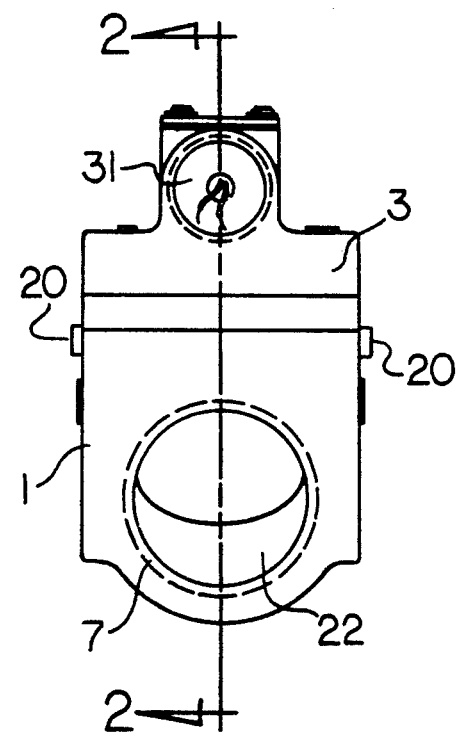
FIG. 1 is an end view of a valve of the invention.
Figure 3:
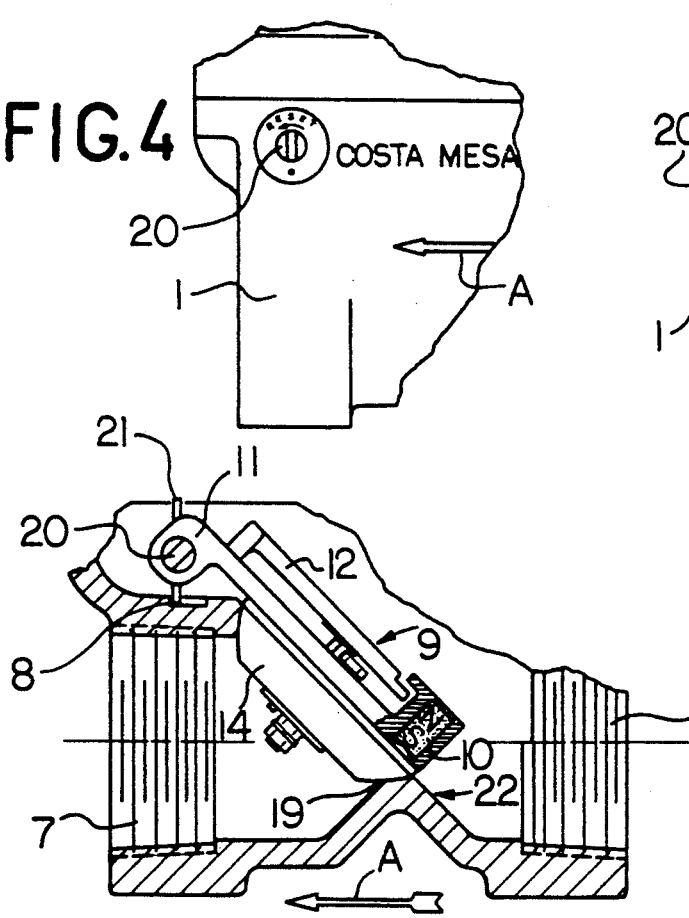
FIG. 3 is a partial side sectional view showing the flapper in closed position.

A safety shutoff valve of the invention has preferably a body 1, typically of cast brass, with ports 5, 7 threaded to receive the ends of pipes, FIGS. 1-3. An integral partition member 22 has an opening 19 machined as a valve seat, FIGS. 2-3. Partition member 22 is preferably disposed at about a 45 degree angle to the axis of flow, i.e., to the center line of the ports 5, 7. A flapper arm assembly 9 is pivoted on a flapper shaft 20 and carries a flapper sealing element 14. In FIG. 2, the flapper is shown swung up out of the way, permitting fluid to flow into port 5, through the valve seat opening 19, and out through port 7, the valve is open.

In FIG. 3, the flapper arm has swung down on pivot shaft 20 to close the valve. The flapper sealing element 14 is of elastomeric material (usually Buna-N), engaging the valve seat 19 to form a tight seal. The flapper is held against the valve seat by the pressure of the fluid on the upstream side, at port 5. Direction of flow is indicated by arrow A. Element 14 may be shaped as a zone of a solid sphere.

In FIG. 2, the flapper assembly 9 is held up in the open position by the attraction of a permanent magnet 10 to the soft ferromagnetic core 38 of an electromagnet 30. The holding magnet (permanent magnet) 10 is contained in the flapper assembly. To close the valve, an electrical pulse is applied to leads 39 to energize electromagnet 30 in such a direction as to repel the holding magnet 10. The flapper assembly then pivots down under its own weight into the "closed" position shown in FIG. 3. It is held closed by fluid pressure.

Figure 4:
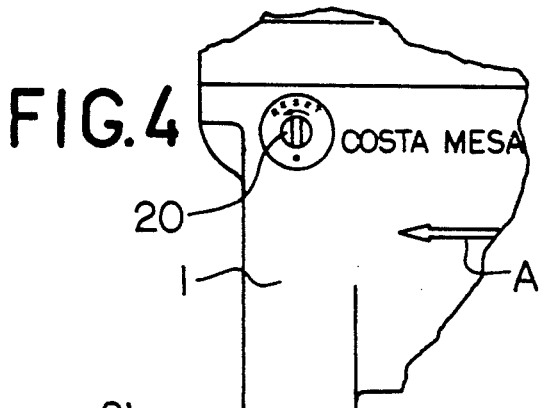
FIG. 4 is a partial side view.

The reset problem is now considered. It will be seen that the flapper assembly 9 comprises two different pivoted arm elements, the primary flapper arm 11 and a smaller, secondary flapper element 12. Both are freely pivoted on shaft 20. The valve is reset by turning shaft 20 counterclockwise, FIG. 4. Shaft 20 protrudes from both sides of the valve body 1, so that it can be reset from either side, FIG. 1.

The flapper assembly is shown in more detail in FIGS. 5-9. FIG. 5 is a top view of the valve with the cover 3 removed to show the primary flapper 11 and the smaller narrow secondary flapper element 12, both pivoted on shaft 20 so as to turn freely thereon through a limited arc. The only transmission of torque from the reset shaft 20 to the flappers 9, 11, 12 is through contact with drive pin 25; this will be described presently.

The cover assembly 3 is now described. This cover fits over the valve body 1 and is held thereon by suitable screws. The mating surfaces are sealed by gasket means such as an 0-ring 15, FIG. 2. The groove for O-ring 15 is shown at 15' in FIG. 5. In the cover 3, FIG. 2, are located the electromagnet 30 with core 38, a suitable port 31 for attachment of an electrical conduit or other fitting, a space 33 for wire connections, and access cover 32.

The flapper assembly is now described in more detail. The FIG. 5, the main or primary flapper, shown in top view, is pivoted on reset shaft 20 as at 11b. Similarly, secondary flapper element 12 is pivoted independently on shaft 20 as at 12b. Primary flapper arm 11 has a raised end portion 13 which houses the holding magnet 10 (FIG. 6) in a sealed manner. With the powerful alloys now available, the magnet 10 may be physically small, of the order of 6 mm diameter by 6 mm long. End portion 13 of flapper arm 11 has an overhanging projection 13a, FIGS. 6-9.

The secondary flapper arm 12 is narrow, and has an end lip-like portion 12a which fits under the overhanging projection 13a. Thus, when secondary arm 12 is raised up, as during reset, it will take the primary flapper arm 11 up with it. This kind of engagement is shown in FIG. 8.

The cooperation between the primary and secondary flappers works as follows. As shown in FIGS. 2, 3, and 6, the primary flapper arm 11 carries a sealing element 14 which fits into the valve seat 19 when the valve is closed. The sealing element 14, of suitable elastomeric material (usually Buna-N) is fastened loosely to the metal flapper arm 11 by a suitable screw or the like 15, shown best in FIG. 6. Screw 15 is a tight fit in sealing element 14 but a loose fit in the hole in arm 11, to permit some self-alignment in the valve seat. Also fitted tightly in element 14 is a pressure relief or bypass tube 16, which passes through a loose clearance hole (0.5 mm oversize or so) in arm 11, with its upper end sealable by a small secondary sealing element 17. The bore of this secondary pressure relief or bypass tube 16 is small, of the order of 0.9 mm.

When the valve of the invention is closed as indicated in FIG. 3, there may exist on the upstream side some residual pressure that tends to hold the valve closed against efforts to reset. If this pressure is over about 0.7 kg/cm$^2$ (10 p.s.i.), it is difficult to reset the valve by applying torque to shaft 20. Such residual pressure may exist when a manual valve on the upstream side is closed, trapping some gas. To relieve such pressure and permit resetting, the above-mentioned pressure relief or bypass tube 16 is provided, shown best in FIGS. 6-9. When torque is applied to the shaft 20 in the counter-clockwise direction (FIG. 4), drive pin 25 in shaft 20 (FIGS. 5 and 7-9) bears on or engages a suitable portion of secondary flapper arm 12 as at 12', FIGS. 7-9, and cause the sealing pad 17, FIG. 7, to be lifted off of the end of bypass tube 16, permitting fluid to flow through it to equalize the pressure on both sides of the valve. When the pressure is reduced enough, the closing force on the primary flapper element 14 becomes low and the primary flapper can be raised from closed position, FIG. 3, to open position, FIG. 2. The primary flapper arm 11 is raised simply by the torque on reset shaft 20 via the secondary flapper arm 12. This is done through the engagement of the tip portion 12a, FIG. 8, with a projection 13a on portion 13 of the primary flapper arm 11.

FIG. 7 shows the relation of primary and secondary flapper arms when the valve is closed, with the end of bypass tube 16 sealed at 17. FIG. 8 shows their relationship when the reset shaft has been turned enough to open the end of tube 16 (which takes little force because the bore area of tube 16 is small), but reset is not complete; tip 12a bears on projection 13a to urge primary flapper arm toward "open". FIG. 9 shows the relation of the two flapper arms when reset is complete and the valve has been reopened.

It is noted that the valve cannot be closed by turning the reset shaft 20. The only torsional operative connection between reset shaft 20 and the flapper arm 12 pivoted thereon, is through the bearing engagement of drive pin 25 with portion 12' of such arm. FIGS. 5 and 7-9.

Should the shaft 20 tend to stick in the counterclockwise "reset" position, it would increase the torque needed to make the flappers drop into the "closed" position when the magnetic force is reduced. The shaft 20 is gasketed by O-rings 24 where it passes through the valve body 1, FIG. 5, which impose some drag on the rotation of shaft 20. To remove this source of drag from the swinging of the flappers, a helical spring 23 is provided, FIG. 5. One end of spring 23 is hooked around stop pin 21 which is pressed through shaft 20; the other end rests against a portion of valve body 1 at 23'. This spring urges the shaft 20 to rotate toward the "closed" position until stop pin 21 comes to rest against a portion of valve body 1 at 8, FIGS. 2 and 3. The result is that after a reset operation the shaft 20 itself is automatically returned toward "closed" by spring 23 while the valve flappers are held up in "open" position by the holding magnet 10. Thus the only frictional force opposing the swinging of the flappers toward "closed" is that of the flapper bores themselves on shaft 20 where they can turn freely; any drag from the O-rings 24 (FIG. 5) is removed.

MODIFIED FORMS

FIGS. 10–12 show a modified form of the means for attracting and releasing the holding magnet 10 which is embedded in the primary flapper arm. Only the magnet 10 is shown in FIGS. 10 and 12, it being understood that the valve body and flapper mechanism below the cover 3 (FIGS. 1–3) is the same as in FIGS. 1–9. The cover 3 in those Figures is, in FIGS. 10–12, replaced by a different cover (of non-magnetic material) indicated semi-diagrammatically at 40.

In FIG. 10, the cover 40 has a hollow cavity portion 45 with walls 34 and a floor portion 36 shaped as a flattish inverted cone. The cone angle as indicated at a is preferably about 5 degrees. Inside this cavity 45 rests a ball of soft ferromagnetic material 41. At the bottom of the cone, the wall is thin enough so that the attraction of magnet 10 to ball 41 is adequate to hold up the valve flapper assembly 9 and keep the valve open. This portion of the wall may be about 1.5 mm thick.

Level 38 is provided to level the device and may be located in cover 35, FIG. 10.

When ball 41 rolls away from the central position where gravity normally keeps it, the attractive force of holding magnet 10 is reduced, so that the flapper arm may drop down to close the valve. This position is shown in FIG. 12.

A top view of cavity 45 is shown in FIG. 11. It is generally cylindrical; ball 41 rests in the center.

A practical design on this principle is found to employ a magnetically soft steel ball about 32 mm in diameter and a cone angle a of 5 degrees. The flapper load is about 50 gm; the ball must be heavy enough to overcome this when accelerated by a seismic disturbance.

Total ball-magnet separation at rest is about 2 mm, and maximum horizontal displacement of ball about 7 mm. The natural oscillatory frequency of this combination is in the range 2 to 4 Hz. ANSI Standard Z21.70-1981 and California Standard No. 12-23-1, 1984, require that such a valve will close within five seconds with a peak sinusoidal acceleration of 0.3 g at 2.5 Hz, and will not close on 0.08 g at 1 Hz or 2.5 Hz, nor on 0.4 g at 10 Hz. These requirements have been met.

This form of the invention requires no external apparatus nor power source.

FIG. 13 shows in semi-diagrammatic a seismically-actuated switch using the ball-and-conical cavity principle of FIGS. 10–12. Ball 41' and cavity 45' with floor 36', in housing 37, are the same as in FIGS. 10–12. In FIG. 13, however, a magnet 10' is embedded in a suitable weight element sliding member 101 that can move up and down in a bore 102. The bottom of member 101 rests on an actuating member of a switch such as a snap-action "Microswitch" 43, and is heavy enough to operate the snap action when the attraction of magnet 10' to iron ball 41' is suitably reduced or removed. Normally the ball 41' rests in the center, at the apex of the inverted conical floor 36', and the attraction of magnet 10' holds the sliding member 101 up. Thus a seismic disturbance that moves ball 41' out of the way will permit member 101 to drop down and actuate the switch 43 with electric cable 44.

I claim:

1. A safety shutoff valve comprising:
   a valve body adapted for insertion into a fluid-carrying line;
   a valve seat partitioning said body and disposed at an angle to the axis of flow therethrough;
   a reset shaft passing transversely through said body and having exposed end portions;
   a flapper assembly pivoted on said shaft and freely swingable therearound between an open position and a closed position,
   said assembly having a primary flapper arm and a sealing element on said arm adapted to seal said valve seat in said closed position;
   a permanent holding magnet attached to said primary flapper arm; and
   controllable magnetic means disposed to be attracted by said holding magnet to hold said primary flapper arm in said open position.

2. A valve as in claim 1, further comprising:
   pin-like means on said shaft disposed to bear against portions of said flapper assembly to swing it from said closed to said open position to reset said valve after closure; and rotary seals between said shaft and said body.

3. A valve as in claim 2, further comprising:
   a small-diameter bypass tube passing through said primary flapper assembly, and
   a secondary flapper arm pivoted on said reset shaft and disposed to seal the end of said tube and to engage said primary flapper to urge it toward said open position.

4. A valve as in claim 3 wherein:
   a said pin-like means is disposed to bear against said secondary flapper arm,
   whereby a rotation of said shaft returns both said flapper arms to said open position.

5. A valve as in claim 4, further comprising:
   spring means disposed to urge said reset shaft to rotate toward said closed position.

6. A valve as in claim 1, wherein:
   said controllable means is an electromagnet having a core,
   the attraction of said holding magnet to said core holding said flapper assembly in said open position when said electromagnet is de-energized, and
   said attraction changing to repulsion to swing said assembly to said closed position when said electromagnet is energized.

7. A valve as in claim 1 wherein:
   said controllable magnetic means comprises a ball of magnetically soft material, and
   a cavity having a floor portion in the general shape of a shallow inverted cone, said ball normally resting in the center portion of said cone in a position to hold said flapper assembly up by the attraction between said ball and said holding magnet;
   said ball being adapted to roll away from center portion in response to a suitable acceleration of said valve and so to lessen said attraction to permit said assembly to drop into said closed position.

* * * * *